(12) United States Patent
Kakishima et al.

(10) Patent No.: US 11,212,794 B2
(45) Date of Patent: Dec. 28, 2021

(54) BASE STATION AND USER EQUIPMENT

(71) Applicant: NTT DOCOMO, INC., Tokyo (JP)

(72) Inventors: Yuichi Kakishima, Palo Alto, CA (US); Kazuki Takeda, Tokyo (JP); Satoshi Nagata, Tokyo (JP); Xin Wang, Beijing (CN); Chongning Na, Beijing (CN); Xiaolin Hou, Beijing (CN); Huiling Jiang, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/403,973

(22) Filed: May 6, 2019

(65) Prior Publication Data

US 2019/0281602 A1  Sep. 12, 2019

Related U.S. Application Data

(63) Continuation of application No. 15/513,356, filed as application No. PCT/JP2015/075007 on Sep. 2, 2015, now abandoned.

(30) Foreign Application Priority Data

Sep. 25, 2014 (JP) .............................. JP2014-195885

(51) Int. Cl.
*H04W 88/08* (2009.01)
*H04W 88/02* (2009.01)
(Continued)

(52) U.S. Cl.
CPC ...... *H04W 72/0446* (2013.01); *H04B 7/0456* (2013.01); *H04B 7/0626* (2013.01);
(Continued)

(58) Field of Classification Search
CPC ............. H04W 72/0446; H04W 16/28; H04W 72/0413; H04W 88/02; H04W 88/08;
(Continued)

(56) References Cited

U.S. PATENT DOCUMENTS

2012/0014349 A1\* 1/2012 Chung ................. H04B 7/0684
370/329
2012/0039298 A1  2/2012 Lee et al.
(Continued)

FOREIGN PATENT DOCUMENTS

CN    102414999 A    4/2012
CN    102742195 A    10/2012
(Continued)

OTHER PUBLICATIONS

English translation of Chen et al. (WO 2015035645 A1) (Year: 2015).*

(Continued)

*Primary Examiner* — Moo Jeong
(74) *Attorney, Agent, or Firm* — Osha Bergman Watanabe & Burton LLP (57) ABSTRACT

In one aspect, a user equipment is disclosed including a control unit configured to precode an uplink reference signal based on a downlink reference signal, and a transmission unit configured to transmit the precoded uplink reference signal. In another aspect, a transmission method is disclosed including precoding an uplink reference signal based on a downlink reference signal, and transmitting the precoded uplink reference signal.

8 Claims, 7 Drawing Sheets

(51) Int. Cl.
  *H04W 72/04* (2009.01)
  *H04W 16/28* (2009.01)
  *H04L 5/22* (2006.01)
  *H04L 5/00* (2006.01)
  *H04L 25/02* (2006.01)
  *H04B 7/06* (2006.01)
  *H04B 7/0456* (2017.01)
  *H04B 7/0404* (2017.01)

(52) U.S. Cl.
  CPC ......... *H04B 7/0632* (2013.01); *H04L 5/0026* (2013.01); *H04L 5/0048* (2013.01); *H04L 5/0057* (2013.01); *H04L 5/0082* (2013.01); *H04L 5/22* (2013.01); *H04L 25/02* (2013.01); *H04L 25/0204* (2013.01); *H04L 25/0226* (2013.01); *H04W 16/28* (2013.01); *H04W 72/0413* (2013.01); *H04B 7/0404* (2013.01); *H04L 5/006* (2013.01); *H04W 88/02* (2013.01); *H04W 88/08* (2013.01)

(58) Field of Classification Search
  CPC . H04L 25/0226; H04L 5/0048; H04L 5/0026; H04L 5/0057; H04L 5/22; H04L 25/0204; H04L 5/0082; H04L 5/006; H04L 25/02; H04B 7/0632; H04B 7/0626; H04B 7/0404
  See application file for complete search history.

(56) References Cited

U.S. PATENT DOCUMENTS

| | | |
|---|---|---|
| 2012/0176999 A1 | 7/2012 | Zhang et al. |
| 2012/0224557 A1 | 9/2012 | Noh et al. |
| 2013/0039319 A1* | 2/2013 | Shi ................ H04L 27/2613 370/329 |
| 2014/0198747 A1* | 7/2014 | Ouchi ................ H04L 5/0053 370/329 |
| 2014/0213315 A1* | 7/2014 | Kim ................ H04W 52/325 455/522 |
| 2014/0219232 A1 | 8/2014 | Takeda et al. |
| 2014/0269502 A1 | 9/2014 | Forenza et al. |
| 2014/0355546 A1 | 12/2014 | Noh et al. |
| 2015/0085787 A1 | 3/2015 | Ouchi |
| 2015/0188685 A1 | 7/2015 | Yamazaki |
| 2015/0304076 A1 | 10/2015 | Lee et al. |
| 2016/0381583 A1* | 12/2016 | Sawahashi ......... H04B 7/0456 370/252 |
| 2017/0264412 A1* | 9/2017 | Chen .................. H04L 5/0048 |
| 2018/0227894 A1 | 8/2018 | Noh et al. |
| 2019/0165903 A1 | 5/2019 | Lee et al. |

FOREIGN PATENT DOCUMENTS

| | | | |
|---|---|---|---|
| JP | 2011-259258 A | 12/2011 | |
| JP | 2013-511203 A | 3/2013 | |
| JP | 2014-158292 A | 8/2014 | |
| WO | 2013/168793 A1 | 11/2013 | |
| WO | 2014017477 A1 | 1/2014 | |
| WO | 2014020815 A1 | 2/2014 | |
| WO | 2014065850 A1 | 5/2014 | |
| WO | 2014142585 A1 | 9/2014 | |
| WO | WO-2015035645 A1 * | 3/2015 | ........... H04B 7/0421 |

OTHER PUBLICATIONS

International Search Report issued in corresponding application No. PCT/JP2015/075007 dated Oct. 27, 2015 (4 pages).
Written Opinion of the International Searching Authority issued in corresponding application No. PCT/JP2015/075007 dated Oct. 27, 2015 (5 pages).
3GPP TS 36.213 V12.2.0, "3rd Generation Partnership Project; Technical Specification Group Radio Access Network Evolved Universal Terrestrial Radio Access (E-UTRA); Physical layer procedures (Release 12)"; Jun. 2014 (207 pages).
Office Action issued in counterpart Chinese Patent Application No. 201580051308.1, dated Sep. 4, 2019 (21 Pages).
3GPP TSG RAN WG1 #56; R1-090943 "Non-codebook-based Precoding for Uplink transmission" CATT, CMCC, RITT; Athens, Greece; Feb. 9-13, 2009 (6 pages).
Office Action issued in Japanese Application No. 2019-100176; dated Mar. 31, 2020 (5 pages).
Office Action issued in Japanese Application No. 2019-100176; dated Oct. 20, 2020 (5 pages).

* cited by examiner

TDM and FDM 1

BASE STATION AND USER EQUIPMENT

CROSS-REFERENCE TO RELATED APPLICATIONS

The present application is a continuation application and, thereby, claims benefit under 35 U.S.C. § 120 to U.S. patent application Ser. No. 15/513,356 filed on Mar. 22, 2017, titled, "BASE STATION AND USER EQUIPMENT," which is a national stage application of PCT Application No. PCT/JP2015/075007, filed on Sep. 2, 2015, which claims priority to Japanese Patent Application No. 2014-195885 filed on Sep. 25, 2014. The contents of the priority applications

TECHNICAL FIELD

The present invention relates to a radio communication system.

BACKGROUND ART

In LTE (Long Term Evolution) standard, MIMO (Multiple-Input Multiple-Output) technique using multiple antenna ports is sophisticated. In typical MIMO communication, user equipment estimates a downlink channel state based on downlink reference signals received from a base station and feeds the estimated downlink channel state as channel state information (CSI) back to the base station. The base station controls downlink beam forming based on feedback of the channel state information. According to this approach, a feedback channel is necessary for feedback of the channel state information, and more resources for the feedback channel must be reserved due to increase in the number of users and/or the number of antennas.

For the problem of resource reservation for the feedback channel, reciprocity based precoding is discussed. The reciprocity based precoding is an approach where a base station measures an uplink channel state instead of measuring the downlink channel state to control downlink beam forming based on the measured uplink channel state. This is based on assumption where the uplink channel state is almost identical to the downlink channel state, and measurement results of the uplink channel state are used instead of the downlink channel state. The uplink channel state is currently measured based on uplink reference signals such as a sounding reference signal and a pilot signal from the user equipment.

See 3GPP TS36.213 V12.2.0 (2014-06) for further details, for example.

SUMMARY OF INVENTION

Problem To Be Solved By the Invention

Figure 1:
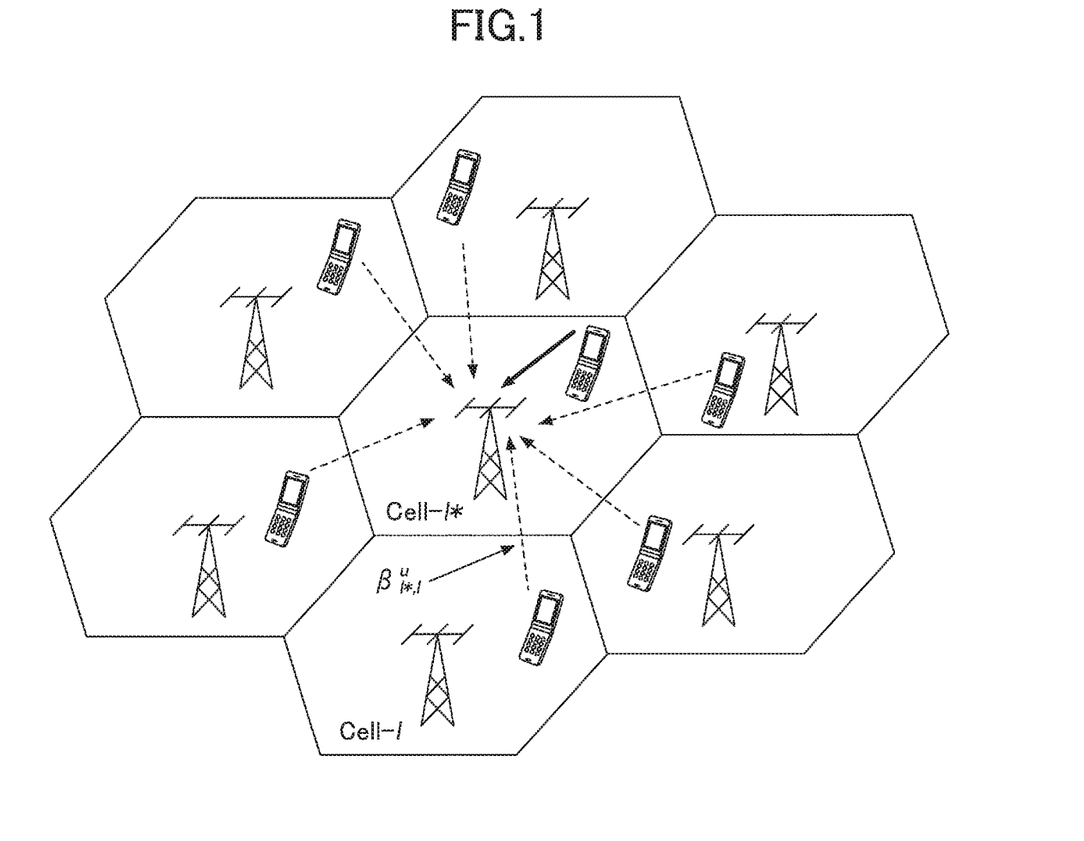
FIG. 1 is a schematic diagram for illustrating interference of pilot signals.

In the case where the measurement results of the uplink channel state are used instead of the downlink channel state, however, it is necessary to transmit the sounding reference signals frequently. If each user equipment transmits the sounding reference signal frequently, as illustrated in FIG. 1, it is predicted that there is much influence of interference from user equipments visiting other cells. Particularly, an amount of transmitted sounding reference signals increases due to increase in the number of users and the number of user antennas, the sophisticated MIMO techniques such as 3D MIMO using a large number of antenna ports or the like, and it is considered that it may be difficult to reserve resources for the sounding reference signals. Also, it is considered that interference of uplink signals among user equipments may be more significant.

Also, according to the reciprocity based precoding, a base station can select a precoder or a precoding matrix indicator (PMI) based on the estimated uplink channel state. However, the base station cannot estimate channel quality or an interference state in the user equipment.

In light of the above-stated problem, an object of the present invention is to provide techniques for implementing MIMO communication in accordance with the reciprocity based precoding.

Means For Solving the Problem

In order to achieve the above object, one aspect of the present invention relates to a base station for implementing multi-antenna transmission, comprising: a communication control unit configured to control multi-antenna transmission with user equipment; and a channel state estimation unit configured to estimate a channel state with the user equipment based on an uplink reference signal from the user equipment, wherein the communication control unit causes the user equipment to transmit the uplink reference signal in an uplink shared channel in an uplink subframe.

Another aspect of the present invention relates to user equipment, comprising: a communication control unit configured to control radio communication with a base station; and a channel state feedback unit configured to estimate a channel state with the base station based on a reference signal received from the base station and feed the estimated channel state back to the base station, wherein the communication control unit transmits an uplink reference signal to the base station in an uplink shared channel in an uplink subframe.

Advantage of the Invention

According to the present invention, it is possible to implement the MIMO communication in accordance with the reciprocity based precoding.

EMBODIMENTS OF THE INVENTION

Embodiments of the present invention are described below with reference to the drawings.

In embodiments as stated below, a base station and user equipment are disclosed for implementing MIMO communication by using reciprocity based precoding where downlink signals are precoded based on an uplink channel state. Summarizing the embodiment below, the base station configures uplink subframes for reference signals for uplink channel estimation based on the reciprocity based precoding and causes the user equipment to transmit uplink reference signals in an uplink shared channel (Physical Uplink Shared Channel: PUSCH) in an uplink subframe. Accordingly, the base station can use not only existing sounding reference signals but also the uplink reference signals transmitted in the uplink shared channel to achieve accurate uplink channel estimation and determine a downlink precoder based on the estimation result.

Also, the base station sends the user equipment a downlink reference signal (for example, a CSI-RS, a DM-RS and so on) to which the precoder determined in accordance with the reciprocity is applied, for example, and acquires channel quality (for example, an interference state) at the user equipment as feedback information. Accordingly, the interference state at the user equipment, which cannot be estimated in accordance with the reciprocity based precoding, can be obtained, and more appropriate MIMO communication can be achieved.

Figure 2:
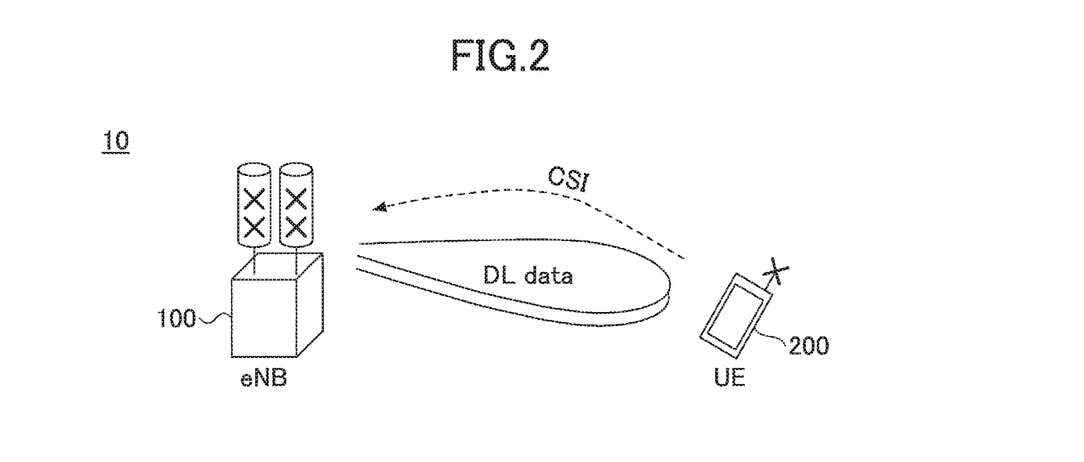
FIG. 2 is a schematic diagram for illustrating a radio communication system according to one embodiment of the present invention.

At the outset, a radio communication system according to one embodiment of the present invention is described with reference to FIG. 2. FIG. 2 is a schematic diagram for illustrating a radio communication system according to one embodiment of the present invention.

As illustrated in FIG. 2, the radio communication system 10 has a base station 100 and user equipment 200. The radio communication system 10 is an LTE system or an LTE-Advanced (LTE-A) system, but is not limited to it, and may be any radio communication system that support the MIMO communication.

The base station 100 implements the MIMO communication with the user equipment 200. The base station 100 particularly supports 3D MIMO communication and wirelessly connects for the user equipment 200 via multiple antennas in incorporated multi-dimensional antennas such as two-dimensional planar antennas and three-dimensional antennas. Specifically, the base station 100 transmits downlink (DL) packets received from a network device such as an upper station and a server communicatively connected on a core network (not shown) to the user equipment 200 via multiple antenna ports and transmits uplink (UL) packets received from the user equipment 200 via the multiple antenna ports to the network device.

The base station 100 is typically composed of hardware resources such as MIMO antennas for transmitting and receiving radio signals to/from the user equipment 200, communication interfaces for communicating with adjacent base stations 100 (for example, an X2 interface), communication interfaces for communicating with the core network (for example, an S1 interface) and a processor or circuit for processing transmission and reception signals with the user equipment 200. Functions and operations of the base station 100 as stated below may be implemented by the processor running or processing data and/or programs stored in a memory device. However, the base station 100 is not limited to the above-stated hardware arrangement and may have any other appropriate hardware arrangement. In general, a large number of base stations 100 are disposed to cover a service area of the radio communication system 10.

The user equipment 200 implements the MIMO communication with the base station 100 and transmits and receives radio signals such as various data signals and control signals to/from the base station 100 via multiple antenna ports of the base station 100. In order to implement appropriate MIMO communication, the user equipment 200 estimates channel states with respective antenna ports and feeds the estimated channel states as channel state information (CSI) back to the base station 100. Upon receiving the channel state information, the base station 100 controls the MIMO communication based on the received channel state information.

The user equipment 200 may be typically any appropriate information processing device having a radio communication function such as a smartphone, a cellular phone, a tablet, a mobile router and a wearable terminal. The user equipment 200 is composed of a CPU (Central Processing Unit) such as a processor, a memory device such as a RAM (Random Access Memory) and a flash memory, a radio communication device for transmitting and receiving radio signals to/from the base station 100 and the like. For example, functions and operations of the user equipment 200 as stated below may be implemented by the CPU running or processing data and/or programs stored in the memory device. However, the user equipment 200 is not limited to the above-stated hardware arrangement and may be composed of circuits for implementing one or more of the operations as stated below.

Figure 3:
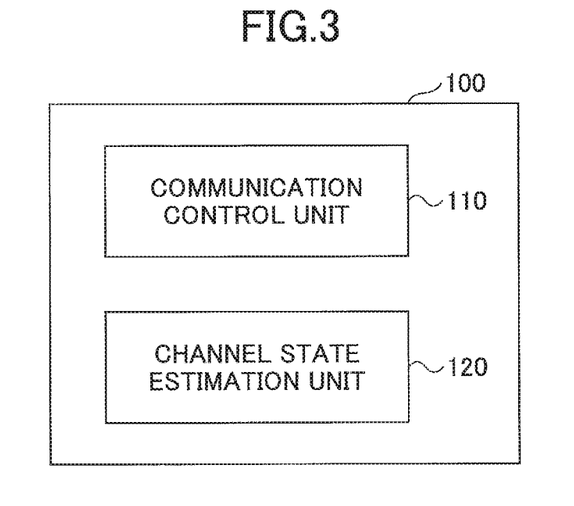
FIG. 3 is a block diagram for illustrating an arrangement of a base station according to one embodiment of the present invention.

Next, a base station according to one embodiment of the present invention is described with reference to FIGS. 3-8. FIG. 3 is a block diagram for illustrating an arrangement of the base station according to one embodiment of the present invention.

As illustrated in FIG. 3, the base station 100 has a communication control unit 110 and a channel state estimation unit 120. The base station 100 implements MIMO communication and is particularly preferable for 3D MIMO communication in accordance with the reciprocity based precoding.

The communication control unit 110 controls multi-antenna transmission with the user equipment 200. Specifically, the communication control unit 110 assigns radio resources to the user equipment 200 and uses the assigned radio resources to transmit and receive radio signals to/from the user equipment 200 via multiple antenna ports in multi-antenna transmission. For example, in uplink transmission from the user equipment 200, the communication control unit 110 assigns radio resources (subcarriers, resource units or the like) in uplink subframes to the user equipment 200, and the user equipment 200 uses the assigned radio resources to transmit uplink signals. Also, in downlink transmission to the user equipment 200, the communication control unit 110 assigns radio resources (subcarriers, resource units or the like) in downlink subframes for transmission to the user equipment 200 and transmits downlink signals to the user equipment 200 in the assigned radio resources.

The channel state estimation unit 120 estimates a channel state with the user equipment 200 based on an uplink reference signal from the user equipment 200. Specifically, the channel state estimation unit 120 uses the reciprocity based precoding to estimate an uplink channel state based on the received uplink reference signal and controls downlink beam forming based on the estimated uplink channel state.

In order to implement appropriate MIMO communication in accordance with the reciprocity based precoding, the channel state estimation unit 120 has to receive uplink reference signals frequently and estimate an uplink channel state. In this embodiment, the communication control unit 110 causes the user equipment 200 to transmit an uplink reference signal in an uplink shared channel in an uplink subframe. Specifically, in addition to an existing sounding reference signal and/or uplink demodulation reference signal assigned to a predetermined domain in the uplink subframe, the communication control unit 110 causes the user equipment 200 to transmit the uplink reference signal in an uplink shared channel domain in the uplink subframe.

In one embodiment, the communication control unit 110 may use time division multiplexing (TDM), frequency division multiplexing (FDM), code division multiplexing (CDM) or one or more combinations of the time division multiplexing, the frequency division multiplexing and the code division multiplexing to cause the user equipment 200 to transmit the uplink reference signal in the uplink shared channel in the uplink subframe.

Figure 4:
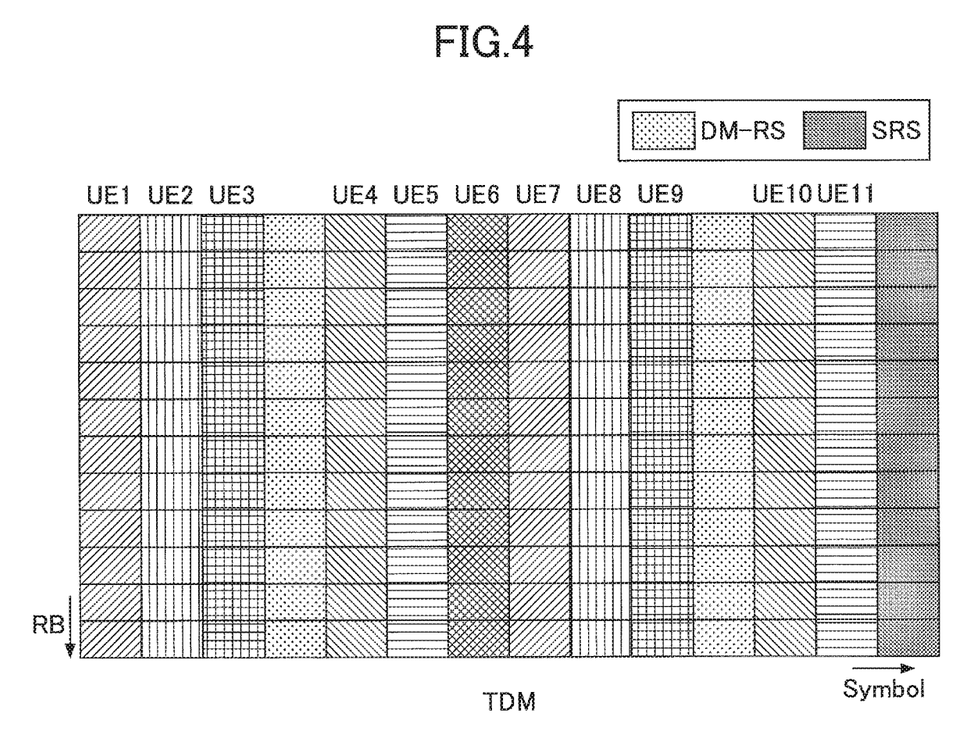
FIG. 4 is a diagram for illustrating exemplary multiplexing of reference signals according to one embodiment of the present invention.

For example, as illustrated in FIG. 4, the communication control unit 110 may assign the uplink shared channel in a predetermined uplink subframe to the user equipments UE1 to UE 11 in according to the time division multiplexing and cause the uplink reference signal to be transmitted in the assigned uplink shared channel domain instead of an uplink data signal. As illustrated, a sounding reference signal (SRS) and an uplink demodulation reference signal (DM-RS) are assigned to a predetermined time domain in the uplink subframe, and the other domains are assigned to the uplink shared channel to transmit the uplink data signal. In this embodiment, however, a predetermined uplink subframe as a whole is assigned for transmission of the uplink reference signal as illustrated, and the uplink shared channel (domains other than the SRS and the DM-RS) in the uplink subframe is assigned to cause the user equipments UE1 to UE 11 to transmit the uplink reference signal.

Figure 5:
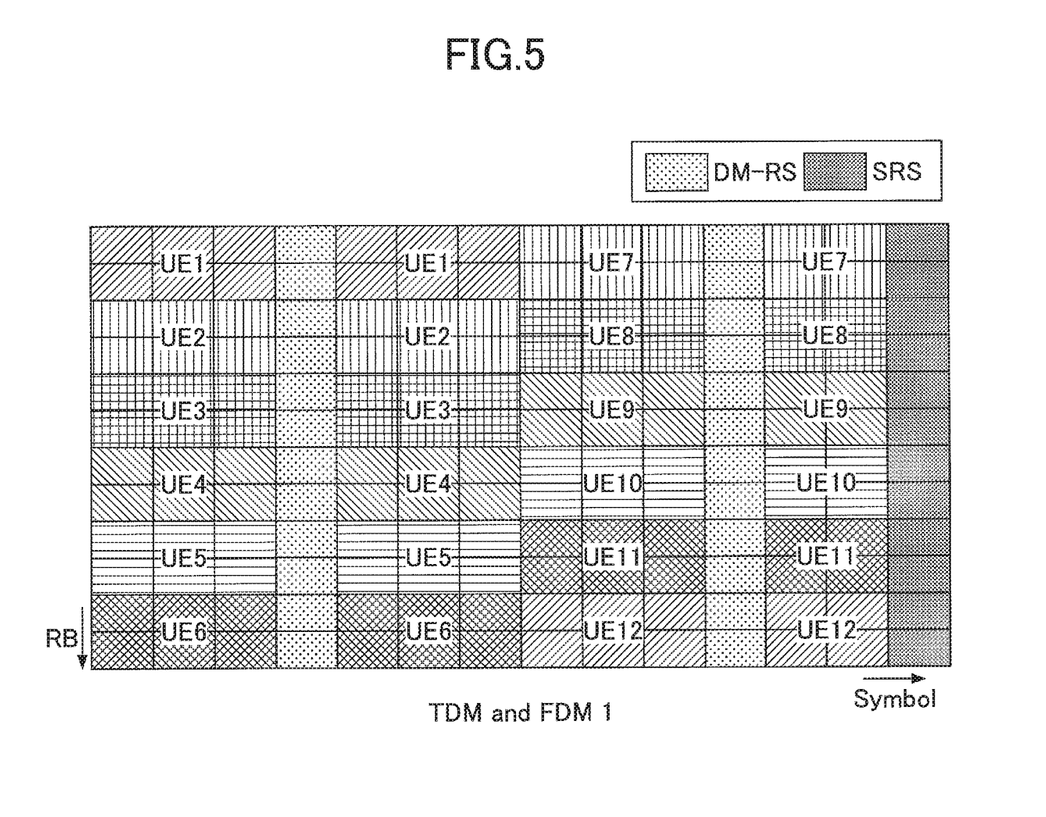
FIG. 5 is a diagram for illustrating exemplary multiplexing of reference signals according to one embodiment of the present invention.

Also, as illustrated in FIG. 5, the communication control unit 110 may assign the uplink shared channel in a predetermined uplink subframe to the user equipments UE1 to UE11 in accordance with a combination of the time division multiplexing and the frequency division multiplexing and cause the uplink reference signal to be transmitted in the assigned uplink shared channel domain instead of the uplink data signal. Compared to scheduling in FIG. 4, the respective user equipments UE1 to UE12 transmit the uplink reference signals only in a part of a frequency domain in each transmission time interval, and this subband transmission may be preferred from standpoint of limited power at the user equipments 200.

Figure 6:
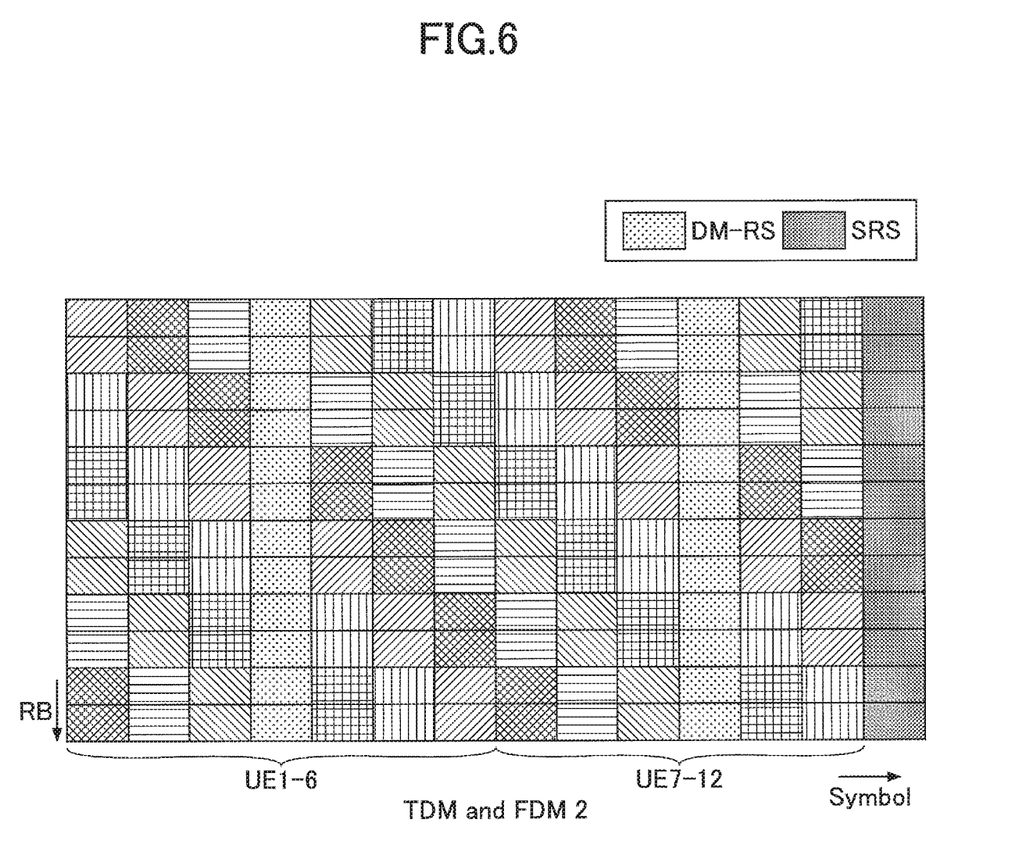
FIG. 6 is a diagram for illustrating exemplary multiplexing of reference signals according to one embodiment of the present invention.

Also, as illustrated in FIG. 6, the communication control unit 110 may assign the uplink shared channel in a predetermined uplink subframe to the user equipments UE1 to UE12 in accordance with a combination of the time division multiplexing and the frequency division multiplexing and cause the uplink reference signal to be transmitted in the assigned uplink shared channel domain instead of the uplink data signal. Compared to scheduling in FIG. 5, the respective user equipments UE1 to UE12 transmit the uplink reference signals only in a part of a frequency domain in each transmission time interval and transmit the uplink reference signals in the whole frequency domain in the whole time domain. In general, there are cases where the transmission power may become insufficient in uplink, but in this example, the whole system band is covered while reducing influence of limited power at the user equipment 100. Accordingly, the subband transmission may be more preferable.

Figure 7:
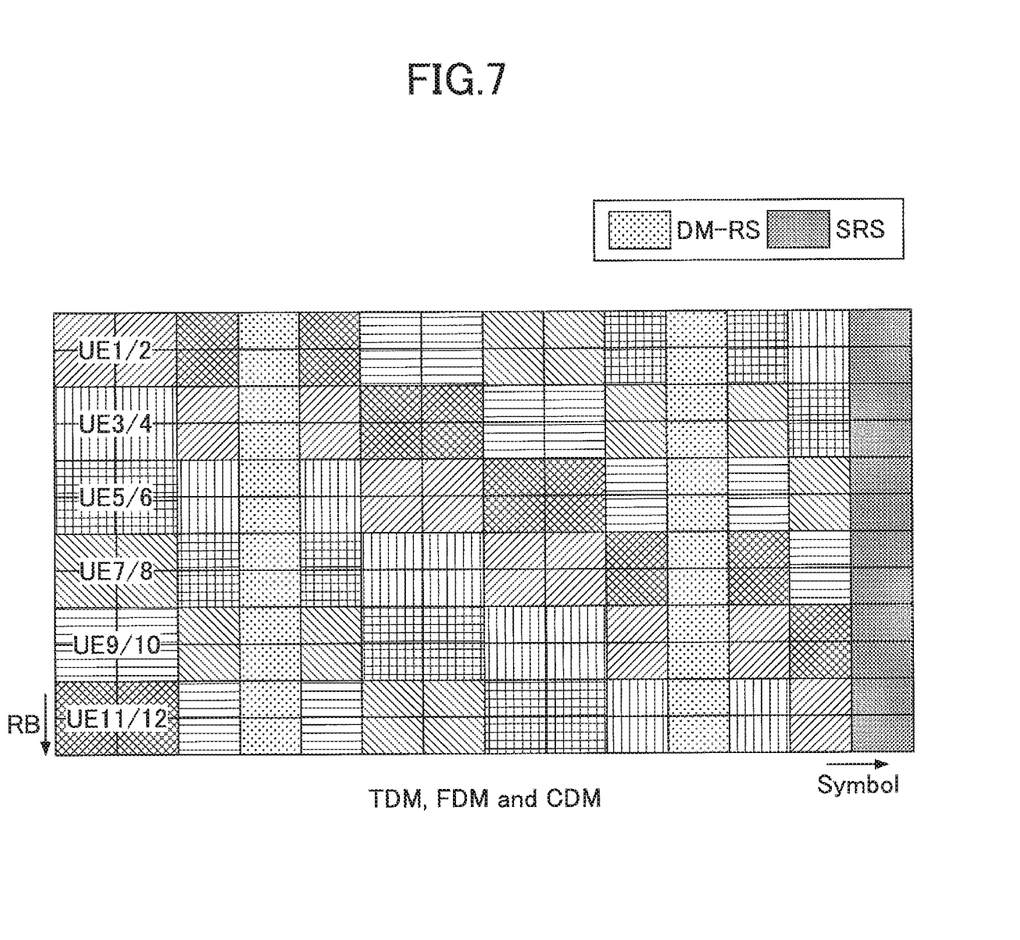
FIG. 7 is a diagram for illustrating exemplary multiplexing of reference signals according to one embodiment of the present invention.

Also, as illustrated in FIG. 7, the communication control unit 110 may assign the uplink shared channel in a predetermined uplink subframe to the user equipments UE1 to UE12 in accordance with a combination of the time division multiplexing, the frequency division multiplexing and the code division multiplexing and cause the uplink reference signal to be transmitted in the assigned uplink shared channel domain instead of the uplink data signal. Compared to scheduling in FIG. 6, the respective user equipments UE1 to UE12 transmit the uplink reference signals only in a part of a frequency domain in each transmission time interval and transmit the uplink reference signals in the whole frequency domain in the whole time domain. Furthermore, the respective user equipments UE1 to UE12 transmit the uplink reference signals in multiple transmission time periods in accordance with the code division multiplexing without reducing the number of assigned user equipments. In general, an RF error such as a time error and a frequency error arises in a radio device, and it may be preferable for estimation and reduction in influence of the RF error to transmit the uplink reference signal in multiple transmission time periods. Similarly, the respective user equipments UE1 to UE12 transmit the uplink reference signals in multiple frequency positions, but it may be preferable for estimation and reduction in the influence of the RF error to transmit the uplink reference signals in the multiple frequency positions.

Figure 8:
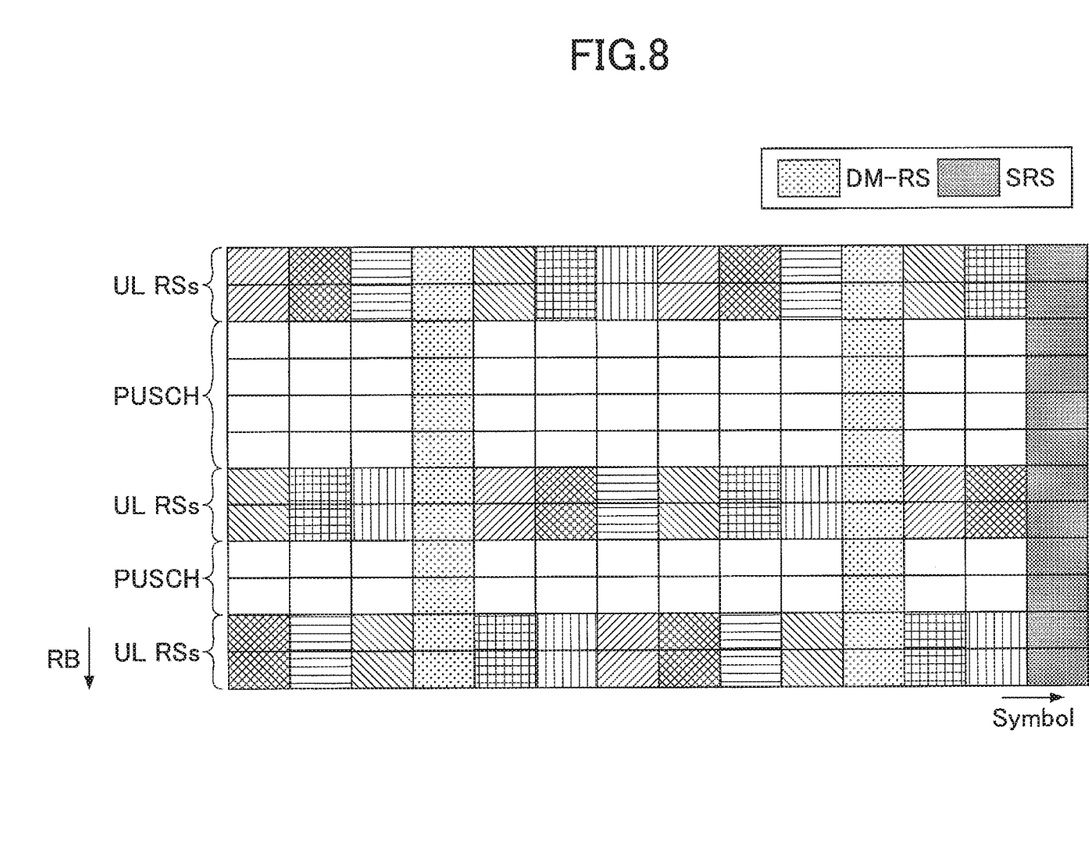
FIG. 8 is a diagram for illustrating exemplary multiplexing of reference signals according to one embodiment of the present invention.

In one embodiment, the communication control unit 110 may cause the user equipment 200 to transmit an uplink reference signal in the whole or a part of an uplink shared channel in an uplink subframe. In the examples as illustrated in FIGS. 4-7, the communication control unit 110 causes the user equipment 200 to transmit the uplink reference signal in the whole uplink shared channel domain in a predetermined uplink subframe. On the other hand, as illustrated in FIG. 8, the communication control unit 110 may cause the user equipment 200 to transmit an uplink data signal in a partial domain of the uplink shared channel other than domains for the sounding reference signal (SRS) and the uplink demodulation reference signal (DM-RS). In other words, the user equipment 200 may transmit the uplink data signal in the other domains of the uplink shared channel.

Also, the communication control unit 110 may cause the user equipment 200 to transmit the uplink reference signal in not only the uplink shared channel but also domains for the sounding reference signal and/or the uplink demodulation reference signal. Particularly, if the uplink data signal is not transmitted in the uplink shared channel, it is not so necessary to transmit the uplink demodulation reference signal, and the uplink demodulation reference signal domain may be assigned for transmission of the uplink reference signal.

Also, the communication control unit 110 may indicate radio resources for the uplink reference signal in RRC (Radio Resource Control) and/or (e)PDCCH (Physical Downlink Control Channel). Specifically, the communication control unit 110 may specify the radio resources for the uplink reference signal with a position in a time domain (a transmission time interval or a symbol), a position in a frequency domain (a resource block or a subcarrier), a bandwidth, a cyclic shift (CS) index, a timing offset, a cycle for cyclic transmission or the like.

In one embodiment, the communication unit 110 may periodically assign an uplink subframe to cause the user equipment 200 to transmit an uplink reference signal in an uplink shared channel. Predetermined uplink subframes for transmission of the uplink reference signals as stated above with reference to FIGS. 4-8 may be periodically configured. For example, the communication control unit 110 may assign uplink subframes for the reference signal for each 20 milliseconds.

On the other hand, the communication control unit 110 may aperiodically assign uplink subframes to cause the user equipment 200 to transmit the uplink reference signal in the uplink shared channel. Predetermined uplink subframes for transmission of the uplink reference signals as stated above with reference to FIGS. 4-8 may be aperiodically configured. For example, the communication control unit 110 may trigger transmission of the reference signal in the (e)PDCCH.

In the above-stated embodiments, the communication control unit 110 increases an amount of transmitted uplink reference signals by causing the user equipment 200 to transmit the uplink reference signal in the uplink shared channel. In other embodiments, the communication control unit 110 may adjust the number of user equipments 200 to transmit the sounding reference signal by adjusting a sampling factor of the sounding reference signal. Specifically, the existing sounding reference signal is inserted in a cycle of every two subcarriers, and the insertion cycle may be set to a greater value. Accordingly, the channel state estimation unit 120 can receive the sounding reference signal from a larger number of user equipments 200 and estimate the uplink channel states with the user equipments 200 based on the sounding reference signals received from the larger number of user equipments 200.

Furthermore, the sounding reference signal may be aperiodic or periodic. Also, in order to cause the sounding reference signal to be transmitted in one precoded stream rather than multiple streams, the communication control unit 110 may indicate a PMI for the sounding reference signal to the user equipment 200. On the other hand, the user equipment 200 may autonomously select the PMI for the sounding reference signal and indicate it to the base station 100. Also, the PMI for the sounding reference signal may be the same as one applied to the uplink shared channel.

Also, in order to improve accuracy of the sounding reference signal, the communication control unit 110 may indicate transmission power of the sounding reference signal to the user equipment 200. In the current LTE standard, the transmission power for the sounding reference signal is set to an offset value ($P_{SRS\_OFFSET}$, $_c(m)$) from the transmission power applied to the uplink data channel. In order to improve channel estimation accuracy with the reciprocity based precoding, it is desired that the sounding reference signal is transmitted at higher power. To this end, the communication control unit 110 may set the transmission power of the sounding reference signal individually. Furthermore, the offset value is fixed for a PUSCH for link adaptation control of uplink but does not have to be defined as the offset from standpoint of the reciprocity. Furthermore, since it is undesirable that the power changes without expectation by the base station, it is desired that the transmission power is determined independently of transmission power control of the PUSCH, for example. The discussion of the transmission power can be applied to not only the sounding reference signal but also the other uplink reference signals.

Also, the communication control unit 110 may precode and transmit a downlink reference signal (CSI-RS) for measuring downlink channel states. Also, the communication control unit 110 may indicate a rank for the precoded downlink reference signal. The communication control unit 110 may spatially multiplexes the downlink reference signal to estimate inter-user interference. Also, the communication control unit 110 may transmit the downlink reference signal in an existing reference signal domain or a data domain. Also, the sounding reference signal and the downlink reference signal may be precoded with the same codebook.

Figure 9:
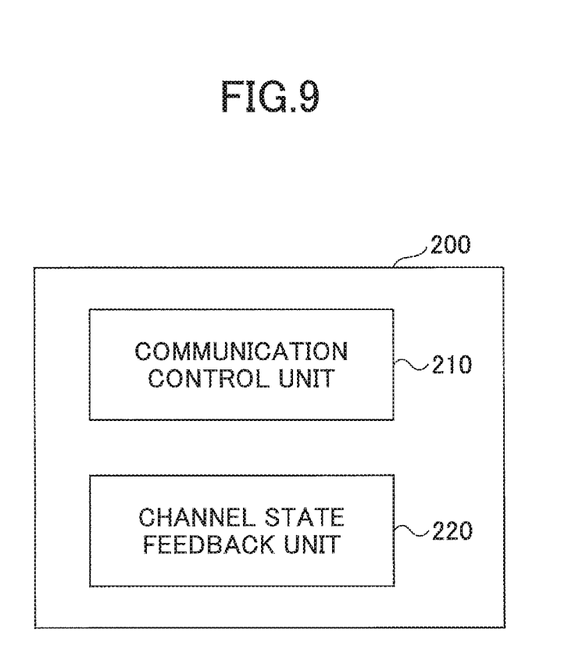
FIG. 9 is a block diagram for illustrating an arrangement of user equipment according to one embodiment of the present invention.

Next, the user equipment according to one embodiment of the present invention is described with reference to FIG. 9. FIG. 9 is a block diagram for illustrating an arrangement of the user equipment according to one embodiment of the present invention.

As illustrated in FIG. 9, the user equipment 200 has a communication control unit 210 and a channel state feedback unit 220. The user equipment 200 implements MIMO communication and is particularly preferable for 3D MIMO communication in accordance with the reciprocity based precoding.

The communication control 210 controls radio communication with the base station 100. Specifically, in downlink communication, the communication control unit 210 receives downlink radio signals transmitted from multiple antenna ports in the base station 100 with beams precoded in the horizontal direction, the vertical direction or the like and uses a codebook for use in the beam control to demodulate the received radio signals. Also, in uplink communication, the communication control unit 110 uses the codebook to transmit uplink radio signals to the base station 100.

The channel state feedback unit 220 estimates a channel state with the base station 100 based on the reference signal received from the base station 100 and feeds the estimated channel state back to the base station 100. As stated above, according to the reciprocity based precoding, the base station 100 can select a codebook or a precoding matrix indicator (PMI) based on the estimated uplink channel state but cannot estimate an interference state, that is, a CQI at the user equipment 200. Accordingly, in order to achieve appropriate MIMO communication, the channel state feedback unit 220 may estimate a channel quality indicator (CQI) based on the reference signal transmitted from the base station and feed the estimated CQI back to the base station 100. In other words, the base station 100 can receive the CQI and/or the rank indicator (RI) as feedback information from the user equipment 200 and know the interference state at the user equipment 200.

In this embodiment, the communication control unit 210 transmits an uplink reference signal to the base station 100 in an uplink shared channel in an uplink subframe. In order to achieve the appropriate MIMO communication in accordance with the reciprocity based precoding, the base station 100 has to receive the uplink reference signal frequently and estimate the uplink channel state. Accordingly, in this embodiment, the communication control unit 210 transmits the uplink reference signal to the base station 100 in an uplink shared channel domain in the uplink subframe in addition to an existing sounding reference signal and/or uplink demodulation reference signal assigned to a predetermined domain in the uplink subframe. For example, the communication control unit 210 may transmit the uplink reference signal in the uplink shared channel in a predetermined uplink subframe for reference signal periodically assigned by the base station 100.

In one embodiment, the channel state feedback unit 220 may estimate a channel state with the base station 100 based on a precoded CSI-RS or a precoded downlink DM-RS. According to the conventional MIMO communication, the user equipment 200 receives a non-precoded CSI-RS, selects an appropriate codebook based on the received CSI-RS and feeds a PMI for the selected codebook as well as a CQI and/or a RI as channel state information (CSI) back to the base station 100. Meanwhile, according to the reciprocity based precoding, the base station 100 selects a codebook or a PMI based on the uplink channel state and transmits radio signals, which are beam controlled under the selected codebook, to the user equipment 200. In other words, the user equipment 200 receives the downlink reference signal precoded with the codebook selected by the base station 100 from the base station 100.

Note that according to the reciprocity based precoding, the base station 100 selects the codebook or the PMI based on the estimated uplink channel state. The base station 100 would transmit the radio signals beam controlled under the selected codebook to the user equipment 200 without the user equipment 200 knowing which of codebooks has been selected. In general, the CQI measured at the user equipment 200 changes depending on a beam control state of the downlink reference signal. Accordingly, it is preferred that the user equipment 200 knows which of codebooks is applied to the received downlink reference signal. To this end, the channel state feedback unit 220 may acquire the PMI for the codebook applied to the received precoded downlink reference signal from the base station 100. Alternatively, the codebook applied to the downlink reference signal may be autonomously selected by the user equipment 200.

Also, if the channel state information estimated based on the downlink DM-RS is fed back to the base station 100, the channel state feedback unit 220 may transmits the channel state information to the base station 100 together with ACK/NACK indicative of whether the downlink data signal has been successfully received.

In one embodiment, the communication control unit 210 uses a part of antennas in the user equipment 200 to transmit the sounding reference signal to the base station 100. Here, the reference signal received from the base station 100 may be precoded based on the sounding reference signal received at the base station 100. The sounding reference signal does not have to be transmitted with all the antennas in the user equipment 200 and may be transmitted from only a part of the antennas such as one antenna for reduction in overhead. It is often sufficient to use only the single antenna to estimate channel characteristics such as an AoD (Angular of Departure), an AoA (Angular of Arrival), a ZoD (Zenith angle of Departure) and a ZoA (Zenith angle of Arrival). The number of antennas to transmit the sounding reference signal may be indicated by the base station 100. Also, if the sounding reference signal is transmitted from multiple antennas, a gain difference between the respective antennas may be compensated for. For example, the transmission power of an antenna having a relatively low gain may be increased.

Also, the communication control unit 210 may transmit the precoded sounding reference signal to the base station 100. It is considered that the precoded sounding reference signal may be received at the base station 100 at higher reception power than the not-precoded sounding reference signal, and it is also considered that the precoded sounding reference signal may reduce influence of interference from other user equipments 200.

According to the base station 100 and the user equipment 200 as stated above, the user equipment 200 first transmits the sounding reference signal in radio resources assigned by the base station 100. The base station 100 selects an optimal downlink precoder or codebook based on the received sounding reference signal and transmits a downlink reference signal precoded with the selects downlink precoder to the user equipment 200. The user equipment 200 feeds a CQI based on the received precoded downlink reference signal back. In this manner, the base station 100 can know interference (inter-cell interference, inter-user interference or the like) at the user equipment 200, which cannot be estimated in accordance with the reciprocity based precoding.

Although the embodiments of the present invention have been described in detail, the present invention is not limited to the above-stated specific embodiments, and various modifications and variations can be made within the spirit of the present invention as recited in claims.

LIST OF REFERENCE SYMBOLS

10: radio communication system
100: base station
200: user equipment

The invention claimed is:

1. A terminal comprising:
a processor configured to precode a sounding reference signal (SRS) using information indicating one or more precoding matrices that is the same as information indicating one or more precoding matrices used for a channel state information reference signal (CSI-RS) transmitted by a base station; and
a transmitter configured to transmit the precoded SRS,
wherein information indicating a radio resource for the SRS is received by Physical Downlink Control Channel (PDCCH).

2. The terminal as claimed in claim 1, wherein transmission power of the SRS is determined independently from transmission power of an uplink shared channel.

3. The terminal as claimed in claim 1, wherein transmission power of the SRS is determined based on a value that is not a fixed offset value.

4. The terminal as claimed in claim 1, wherein the radio resource for the SRS is indicated by Radio Resource Control (RRC).

5. The terminal as claimed in claim 1,
wherein first information indicating a radio resource of a first type for the SRS is received via Radio Resource Control (RRC), and
wherein second information indicating a radio resource of a second type for the SRS is received by the PDCCH.

6. A transmission method comprising:
precoding a sounding reference signal (SRS) using information indicating one or more precoding matrices that is the same as information indicating one or more precoding matrices used for a channel state information reference signal (CSI-RS) transmitted by a base station; and
transmitting the precoded SRS,
wherein information indicating a radio resource for the SRS is received by Physical Downlink Control Channel (PDCCH).

7. A base station comprising:
a receiver configured to receive a sounding reference signal (SRS) precoded by a terminal using information indicating one or more precoding matrices that is the same as information indicating one or more precoding matrices used for a channel state information reference signal (CSI-RS) transmitted by the base station; and
a transmitter configured to transmit information indicating a radio resource for the SRS by Physical Downlink Control Channel (PDCCH).

8. A wireless communication system comprising:
a terminal; and
a base station,
wherein the terminal includes:
  a processor configured to precode a sounding reference signal (SRS) using information indicating one or more precoding matrices that is the same as information indicating one or more precoding matrices used for a channel state information reference signal (CSI-RS) transmitted by the base station; and
  a first transmitter configured to transmit the precoded SRS,
wherein information indicating a radio resource for the SRS is received by Physical Downlink Control Channel (PDCCH), and
wherein the base station includes:
  a receiver configured to receive the SRS precoded by the terminal using the information indicating one or more precoding matrices that is the same as the information indicating one or more precoding matrices used for the CSI-RS transmitted by the base station; and
  a second transmitter configured to transmit information indicating the radio resource for the SRS by PDCCH.

* * * * *